US007716392B2

(12) United States Patent
Kobayashi

(10) Patent No.: US 7,716,392 B2
(45) Date of Patent: May 11, 2010

(54) COMPUTER SYSTEM HAVING AN I/O MODULE DIRECTLY CONNECTED TO A MAIN STORAGE FOR DMA TRANSFER

(75) Inventor: Toru Kobayashi, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 530 days.

(21) Appl. No.: 11/178,405

(22) Filed: Jul. 12, 2005

(65) Prior Publication Data

US 2006/0026310 A1 Feb. 2, 2006

(30) Foreign Application Priority Data

Jul. 14, 2004 (JP) ............... 2004-206993

(51) Int. Cl.
G06F 13/28 (2006.01)
G06F 3/00 (2006.01)
G06F 12/00 (2006.01)
(52) U.S. Cl. ............... 710/28; 710/22; 710/36; 710/220; 711/1; 711/5; 711/167
(58) Field of Classification Search ............... 710/28, 710/220
See application file for complete search history.

(56) References Cited

U.S. PATENT DOCUMENTS

| 5,307,468 | A | | 4/1994 | Schlage | |
|---|---|---|---|---|---|
| 5,978,866 | A | * | 11/1999 | Nain | ............... 710/22 |
| 6,122,680 | A | * | 9/2000 | Holm et al. | ............... 710/52 |
| 6,411,984 | B1 | * | 6/2002 | Leach et al. | ............... 709/200 |
| 2003/0050990 | A1 | * | 3/2003 | Craddock et al. | ............... 709/212 |
| 2003/0185067 | A1 | * | 10/2003 | Dellow | ............... 365/200 |
| 2003/0236941 | A1 | * | 12/2003 | Nishino et al. | ............... 711/104 |
| 2004/0044809 | A1 | * | 3/2004 | Takashima et al. | ............... 710/22 |
| 2004/0193833 | A1 | * | 9/2004 | Hampton et al. | ............... 711/206 |
| 2005/0147126 | A1 | * | 7/2005 | Qiu et al. | ............... 370/474 |

FOREIGN PATENT DOCUMENTS

| JP | 62-231367 A | 10/1987 |
|---|---|---|
| JP | 2-166547 A | 6/1990 |
| JP | 5-120202 A | 5/1993 |

(Continued)

OTHER PUBLICATIONS

Japanese Office Action "Notification of Reason for Refusal" with Mailing date of Oct. 6, 2009; Patent application No. 2004-206993 with English Translation.

(Continued)

Primary Examiner—Henry W. H. Tsai
Assistant Examiner—Michael Sun
(74) Attorney, Agent, or Firm—Studebaker & Brackett PC; Donald R. Studebaker

(57) ABSTRACT

A computer system includes a CPU (Central Processing Unit) and a main storage interconnected by a bus to the CPU. The I/O module for transferring received data and data to be transmitted to and from an external unit is directly connected to the main storage, which stores the received data or the transmission data, so that data transfer can be effected every minimum data cycle that allows an access to a memory macro included in the main storage. This accomplishes high-speed data transfer based on DMA (Direct Memory Access) transfer over the bus.

24 Claims, 8 Drawing Sheets

FOREIGN PATENT DOCUMENTS

| | | |
|---|---|---|
| JP | 7-064899 A | 3/1995 |
| JP | 9-259072 A | 10/1997 |
| JP | 11-175398 A | 7/1999 |
| JP | 2000-311132 A | 11/2000 |
| JP | 2001-142840 A | 5/2001 |
| JP | 2002-215561 A | 8/2002 |
| JP | 2002-219826 A | 8/2002 |

OTHER PUBLICATIONS

Japanese Office Action "Decision of Rejection" with mailing date of Feb. 2, 2010; Patent Application No. 2004-206993 with English Translation.

* cited by examiner

Prior Art

COMPUTER SYSTEM HAVING AN I/O MODULE DIRECTLY CONNECTED TO A MAIN STORAGE FOR DMA TRANSFER

BACKGROUND OF THE INVENTION

1. Field of the Invention

The present invention relates to a computer system mounted on, e.g. an LSI (Large Scale Integration) circuit and using DMA (Direct Memory Access) transfer.

2. Description of the Background Art

A computer system with a DMA controller mounted thereon is conventional. In the event of data transfer, e.g. when data received from an external unit are written in to a main storage, or data stored in the main storage are read out and output to the external unit, a computer system of the type operable at a lower operational speed is designed to give a bus access right to a CPU (Central Processing Unit) so as to cause data to be transferred between the CPU and the main storage. By contrast, a computer system of the type operable at a higher operational speed is adapted to give a bus access right to the DMA controller because data transfer via the CPU is time-consuming. This type of computer system causes the DMA controller to control an I/O (Input/Output) module or interface connected to an external unit such that data transfer to and from the main storage is directly effected without the intermediary of the CPU to thereby implement DMA control.

A specific prior art computer system with a DMA controller mounted thereon will be described with reference to FIG. 7. As shown, the computer system, generally 700, includes a main storage 704 for storing program sequences and data under the control of a CPU 702. The main storage 704 is connected to the CPU 702 and an I/O module 708 via a bus 706 in order to effect data transfer. A DMA controller 712 is used to implement direct data transfer between the I/O module 708 and the main storage 704 without the intermediary of the CPU 702. At this instant, a bus arbitrator 714 arbitrates the CPU 702 and the DMA controller 712 as to the right to use the bus 706.

The I/O module 708 plays the role of an interface that connects the external unit 710 to the computer system 700 for implementing the transfer of received data and data to be transmitted (referred to as transmission data hereinafter) and includes a buffer memory 716 for temporarily storing such data.

In the event of transfer of received data to the main storage 704, the computer system 700 would, if designed operable at a low operational speed, write in the received data to the main storage 704 via the CPU 702. By contrast, the computer system 700 would, if designed operable at a high operational speed, use the DMA controller 712 to directly transfer data to the main storage 704 over the bus 706 because data transfer using the CPU 702 is time-consuming.

The bus arbitrator 714 switches a bus access right every bus access cycle, which is a single period for giving the bus access right, in response to a bus access right request signal. The bus arbitrator 714 therefore does not have to switch the bus access right when the bus access right request signal is not input thereto.

Reference will be made to FIG. 8 for describing how received data are transferred from the external unit 710 to the main storage 704 in the conventional computer system 700. As shown, received data are fed from the external unit 710 to the I/O module 708 (step 802). In response, the I/O module 708 generates a request signal for requesting the transfer of the received data and delivers the request signal to the DMA controller 712 (step 804).

On receiving the request signal, the DMA controller 712 generates a bus access right request signal requesting the use of the bus 706 and delivers the request signal to the bus arbitrator 714 (step 806). Assume that the bus arbitrator 714 has given the bus access right to the CPU 702 when having received the bus access right request signal. Then, the bus arbitrator 714 waits until the break of the above bus access cycle, and then releases the bus access right given to the CPU 702 (step 808).

Subsequently, the bus arbitrator 714 generates a response signal representative of the release of the bus access right, and feeds it to the DMA controller 712 such that the bus access right is given to the DMA controller 712 (step 810). Upon the receipt of the response signal, the DMA controller 712 executes the bus access right and transfers received data from the I/O module 708 to the main storage 704, i.e. executes DMA transfer (step 812).

After the DMA transfer stated above, the DMA controller 712 generate a release signal indicative of the release of the bus access right and feeds the release signal to the bus arbitrator 714. In response, the bus arbitrator 714 releases the bus access right given to the DMA controller 712 and again gives the bus access right to the CPU 702 (step 814).

On the other hand, when the transfer of received data from the I/O module 708 ends, the I/O module 708 feeds a report indicative of the end of data transfer to the CPU 702 by interrupt (step 816). This allows the CPU 702 to, e.g. read out received data from the main storage 704.

As state above, the computer system 700 is capable of directly transferring, with the DMA controller 712, data transferred from the I/O module 708 to the main storage 704 without the intermediary of the CPU 702, and capable of arbitrating, with the bus arbitrator 714, the CPU 702 and the DMA 712 as to the bus access right.

U.S. Pat. No. 5,307,468 to Schlage discloses a data processing system including a main memory and a CPU directly connected to each other, a first switching device for controlling connection between the CPU and the main memory, and a second switching device for controlling connection between a system bus and the main memory. The first and second switching devices are interconnected such that only one of them can release connection between the CPU or the system bus and the main memory, thereby improving the performance of the data processing system. This allows the data processing system to concurrently process as many tasks as possible for thereby reducing the waiting time of the system bus. Further, the CPU and I/O unit, connected to the system bus in a conventional method, can simultaneously access the main memory via a DAM unit.

The computer system 700 with the DMA controller shown in FIG. 7 of the accompanying drawings of the present patent application has some problems left unsolved, as will be described hereinafter. Although the I/O module 708 is connected to the main storage 704 via the bus 706, an access to the main storage 704 is not practicable without the arbitration of a bus access right including a plurality of steps, i.e. a bus access right release request, data transfer, bus access right release and so forth, increasing a period of time necessary for data transfer.

In the computer system 700, the I/O module 708 transfers even a great amount of data to the main storage 704 in a single bus access cycle, occupying thus the bus 706 over several-ten consecutive data transfer cycles. Consequently, the CPU 702, for example, cannot access not only the main storage 704 but also other circuits, or peripherals, over such data transfer cycles. This problem is more serious when a plurality of I/O modules 708 are included in the computer system 700 and request to access the main storage 704 at the same time because the bus access right is sequentially given to the I/O modules 708 for data transfer so as to perform data transfer for each of the I/O modules 708, thus occupying the main storage 704 for a much longer period of time.

While the bus 706 included in the computer system 700 is usually implemented as a synchronous bus, data transfer is effected by a protocol synchronous to a clock signal. As a result, overheads such as a synchronization loss for one or more clock signal period occur in the event of data output to or input from the bus 706.

Moreover, the I/O module 708, which is required to transfer data at a higher transfer rate, includes the buffer memory 716 for temporarily storing received data or data for transmission. However, when the computer system 700 is implemented in, e.g. an LSI form, wider strips of power supply wiring and a number of bus connections must be arranged around the buffer memory 716 because of the layout of the LSI elements. Consequently, despite that the buffer memory 716 is smaller in size than the main storage 704, the former is apt to become two times or more greater in size than the latter when the spaces for the power supply wiring and bus connections are taken into account.

SUMMARY OF THE INVENTION

It is an object of the present invention to provide a computer system using DMA transfer and capable of reducing data transfer time without excessively occupying a storage area and requiring a minimum of area when laid in, e.g. an LSI form.

In accordance with the present invention, a computer system includes an I/O module directly connected to a main storage to thereby implement data transfer that accesses the main storage every minimum data transfer cycle, e.g. one time of data transfer cycle. DMA transfer is thereby accomplished at a higher transfer rate without preventing other circuits from interrupting.

In the computer system of the present invention, even when accesses from a CPU to the main storage and from the I/O module to the same conflict, the accesses can be alternately switched for data transfer every minimum memory access cycle. This successfully prevents a bus and the main storage from being occupied over several-ten data transfer cycles even when a circuit exists which accesses for transferring a great amount of data. In the computer system of the present invention, because the bus is not occupied, the CPU, for example, is capable of accessing the main storage at the same time as the I/O module and accessing even a circuit other than the main storage for free data transfer.

In addition, the computer system in accordance with the invention, the I/O module is adapted to transfer data to the main storage prior to a large amount of data are stored. It is therefore sufficient for the computer system to be provided with a storage device, such as a buffer storage, having its storage capacity smaller, thus minimizing the space required for laying out the components of the system mounted on an LSI chip.

Further, even when a plurality of I/O modules send memory access right request signals to the main storage at the same time, data can be transferred with the memory access right being given to the I/O modules every minimum memory access cycle. At this instant, the CPU or any other circuit can access the main storage at the same time, i.e. a plurality of circuits, including the CPU and I/O modules, can alternately transfer data for thereby enhancing the performance of the entire system.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
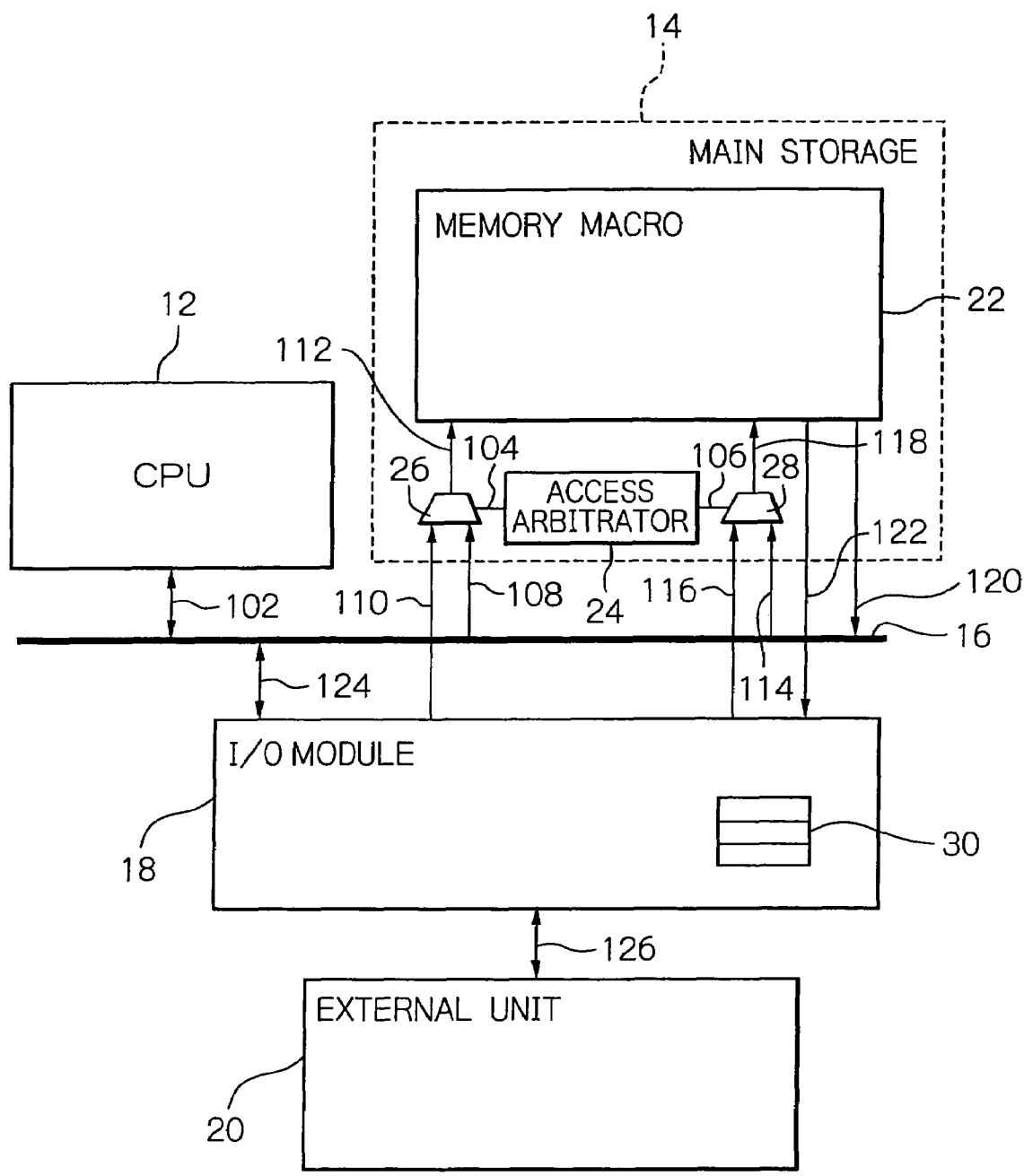
FIG. 1 is a schematic block diagram showing a computer system embodying the present invention.

Referring to FIG. 1 of the drawings, a computer system embodying the present invention is generally designated by the reference numeral 10. As shown, the computer system 10 includes a central processor unit (CPU) 12 for collectively controlling the entire system. The CPU 12 is interconnected by a bus 16 with a main storage 14 for storing data. To the main storage 14, an input/output (I/O) module 18 is connected via the bus 16. The direct interconnection of the main storage 14 additionally with the I/O module 18 accomplishes a direct transfer of received data or data to be transmitted between an external unit or utility device 20, connected to the I/O module 18, and the main storage 14. It is to be noted that portions of the computer system 10 not directly relevant to the understanding of the present invention are not shown, nor detailed description thereof will be made in order to avoid redundancy.

In the illustrative embodiment, various sections other than the main storage 14 may be configured to access the main storage 14 in preselected synchronous memory access cycles. The memory access cycle may be the minimum possible cycle indicative of, e.g. one time of data transfer cycle.

In the illustrative embodiment, the CPU 12, controlling the operation of the entire system 10, is capable of writing in or reading out data to or from the main storage 14 via the bus 16. For example, the CPU 12 may be adapted to always have a memory access right to a memory macro 22 included in the main storage 14 for writing in or reading out data, but lose, only when the main storage 14 indicates the CPU 12 to wait for an access, the memory access right until the above indication is canceled.

More specifically, when received data are fully written in from the I/O module 18 to the main storage 14, the CPU 12 may receive await-for-access cancel signal from the main storage 14 and receive by interruption an end-of-transfer report from the I/O module 18. The CPU 12 may further be adapted to be responsive to the end-of-transfer report to read out the received data, confirm the contents of the received data, edit the received data and then write in the edited data to the main storage 14. In addition, the CPU 12 may further be adapted to execute another processing with the received data. Further, the CPU 12 may check the received data for errors and neglect and discard them if any error is detected.

Furthermore, when sending data to be transmitted, or transmission data, to the external or utility unit 20, the CPU 12 may advantageously be designed to write in the transmission data to the main storage 14 and feed the I/O module 18 with a request signal representative of a data transmission request.

The main storage 14 is configured to store received data or transmission data in the memory macro 22 connected to the bus 16. In the illustrative embodiment, the memory macro 22 may be adapted to be directly connected to the I/O module 18 as well, in which case an access arbitrator 24 will allow either one of the bus 16 and I/O module 18 to access the memory macro 22 for inputting or outputting data.

The memory macro 22 is constituted by, e.g. a number of memory or storage cells and may be configured to write in input data 118 or read out data 120 or 122 to or from a memory cell designated by an address signal 112.

The access arbitrator 24, included in the main storage 14, controls the memory access right to the memory macro 22 in response to a memory access right request signal. In the illustrative embodiment, the access arbitrator 24 arbitrates between the CPU 12 and the I/O module 18 as to the memory access right and generates a control signal 104 or 106 for controlling a multiplexer 26 or 28, respectively, assigned to the CPU 12 or the I/O module 18. For example, the access arbitrator 24 may be configured to usually give the memory access right to the CPU 12, but switch it to the I/O module 18 with priority when having received the memory access right request signal from the I/O module 18.

In the illustrative embodiment, the access arbitrator 24 may be adapted to switch the memory access right every preselected memory access cycle. For example, the access arbitrator 24 may be designed to arbitrate the memory access right in response to the memory access right request signal output from the I/O module 18. In such a case, the access arbitrator 24 should advantageously detect the end of a memory access cycle in which the memory access right request signal is received, or of a predetermined number of memory access cycles following that memory access cycle, to in turn switch the memory access right at the time when the next memory access cycle begins.

In the illustrative embodiment, the multiplexers 26 and 28 may be connected to the bus 16 and I/O module 18 to select an address signal and a data output in response to the control signals 104 and 106, respectively, output from the arbitrator 24. The multiplexer 26 should advantageously select either one of address signals 108 and 110 and feed it to the memory macro 22 in the form of address signal 112. Likewise, the multiplexer 28 should advantageously select either one of data outputs 114 and 116, and feed the selected one to the memory macro 22 as a data output 118.

The I/O module 18 plays the role of an interface connecting the computer system 10 with the external unit 20. Specifically with the illustrative embodiment, the I/O module 18 is interconnected to the main storage 14 and the bus 16. In the illustrative embodiment, the I/O module 18 controls the transfer of received data or transmission data between the main storage 14 and the external unit 20, and includes a buffer memory 30 for temporarily storing the above data. The buffer memory 30 may be implemented by a register or similar storage whose capacity is as small as four or eight bytes.

In the illustrative embodiment, the I/O module 18 may be configured to be responsive to data received from the external unit 20 or a data transmission request signal from the CPU 12 to feed the main storage 14 with the memory access right request signal, and to be responsive to a memory access right allowance signal, when received from the main storage 14, to write in received data 116 to the main storage 14 or read out transmission data 122 from the main storage 14. Further, when the received data 116 are to be written into the main storage 14 or the transmission data 122 are to be read out from the main storage 14, the I/O module 18 may advantageously designate the write or read address of the memory macro 22, respectively, for thereby feeding an address signal 110 to the main storage 14.

The external unit 20 is an input/output utility unit of the type compatible with an electronic apparatus to which the computer system 10 is applied. For example, the external unit 20 may be a keyboard, mouse, CD-ROM (Compact Disk-Read Only Memory) or similar input unit for allowing the user or outside equipment to input information in the computer system 10, a display, printer, loudspeaker or similar output unit for delivering information stored in the computer system 10 to the outside, or a flexible disk, hard disk or any other electromagnetic or optical recording or reproducing medium usable for both of input and output purposes.

Figure 2:
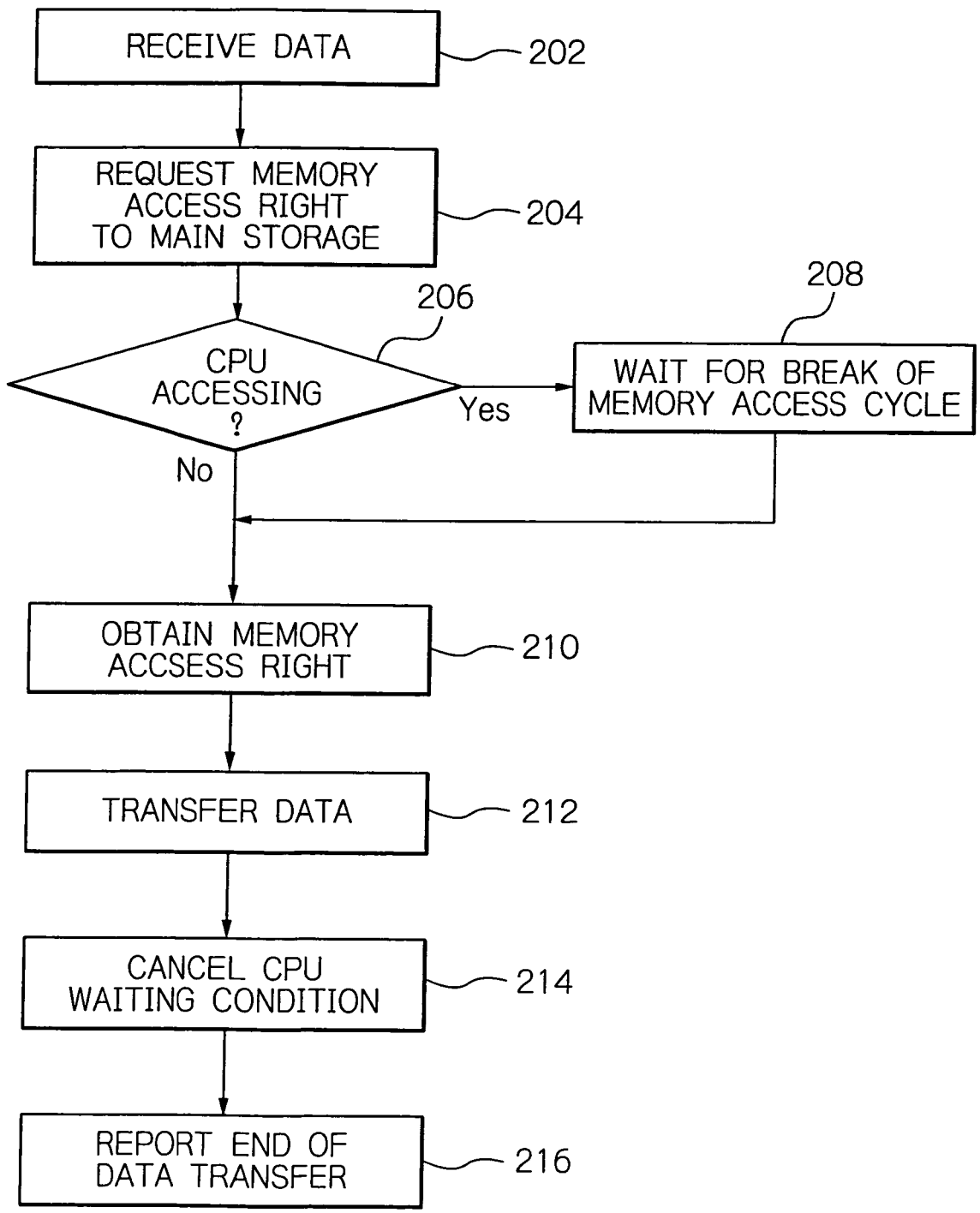
FIG. 2 is a flowchart useful for understanding a specific data receipt procedure unique to the illustrative embodiment.

Reference will now be made to FIG. 2 for describing a specific operation of the computer system 10 on the assumption that the computer system 10 receives data from the external unit 20. As shown, data received from the external unit 20 are temporarily written into the buffer memory 30 of the I/O module 18 (step 202). At this time, the I/O module 18 generates a memory access right request signal requesting a memory access right to the memory macro 22, and then sends the request signal to the main storage 14 (step 204).

In the main storage 14, the memory access right request signal received from the I/O module 18 is fed to the access arbitrator 24. In response, the access arbitrator 24 controls the arbitration of the memory access right to the memory macro 22. More specifically, the access arbitrator 24 determines whether or not priority is given to the memory access right request signal from the I/O module 18 and whether or not any other circuit is given a memory access right when the above request signal is input, e.g. the CPU 12 is accessing the memory macro 22 (step 206).

Subsequently, the access arbitrator 24 waits until the break of the memory access cycle in which the memory access right request signal is received. If the CPU 12 is accessing the memory macro 22 when the break of the memory access cycle is detected (Yes, step 206), the access arbitrator 24 brings the memory access right of the CPU 12 into a waiting condition and feeds a wait-for-access command signal to the CPU 12 (step 208). At the same time, the access arbitrator 24 gives the memory access right to the I/O module 18 and feeds a memory access right allowance signal to the I/O module 18 (step 210). If the answer of the step 206 is negative (No), the step 206 is directly followed by the step 210.

In the step 208, the access arbitrator 24 may be adapted, if desired, to detect a break at which a preselected number of memory access cycles end following the preceding memory access cycle detected.

After the step 210, the I/O module 18 thus having obtained the memory access right transfers the received data to the main storage 14 (step 212). At this instant, the I/O module 18 delivers to the multiplexer 26 an address 110 designating an storage location to which the data should be written in, so that the data associated with that address is fed to the multiplexer 28 via a data output 116.

The multiplexers 26 and 28 respectively receive from the access arbitrator 24 the control signals 104 and 106 each giving the memory access right to the I/O module 18. In response, the multiplexers 26 and 28 respectively feed the address signal 110 and data signal 116 to the memory macro 22 in the form of address signal 112 and data output 118. Consequently, in the memory macro 22, the data output 118 is written into an address location designated by the address signal 112.

After the transfer of all received data from the I/O module 18 to the memory macro 22, the I/O module 18 sends a memory access right release signal representative of the release of the memory access right to the access arbitrator 24. In response, the access arbitrator 24 cancels the waiting condition of the CPU 12 and feeds a wait-for-access cancel signal to the CPU 12 (step 214).

Further, the I/O module 18 delivers a report indicative of the end of received data transfer to the CPU 12. On receiving this report, the CPU 12 of the illustrative embodiment, for example, reads out the received data from the main storage 14.

Figure 3:
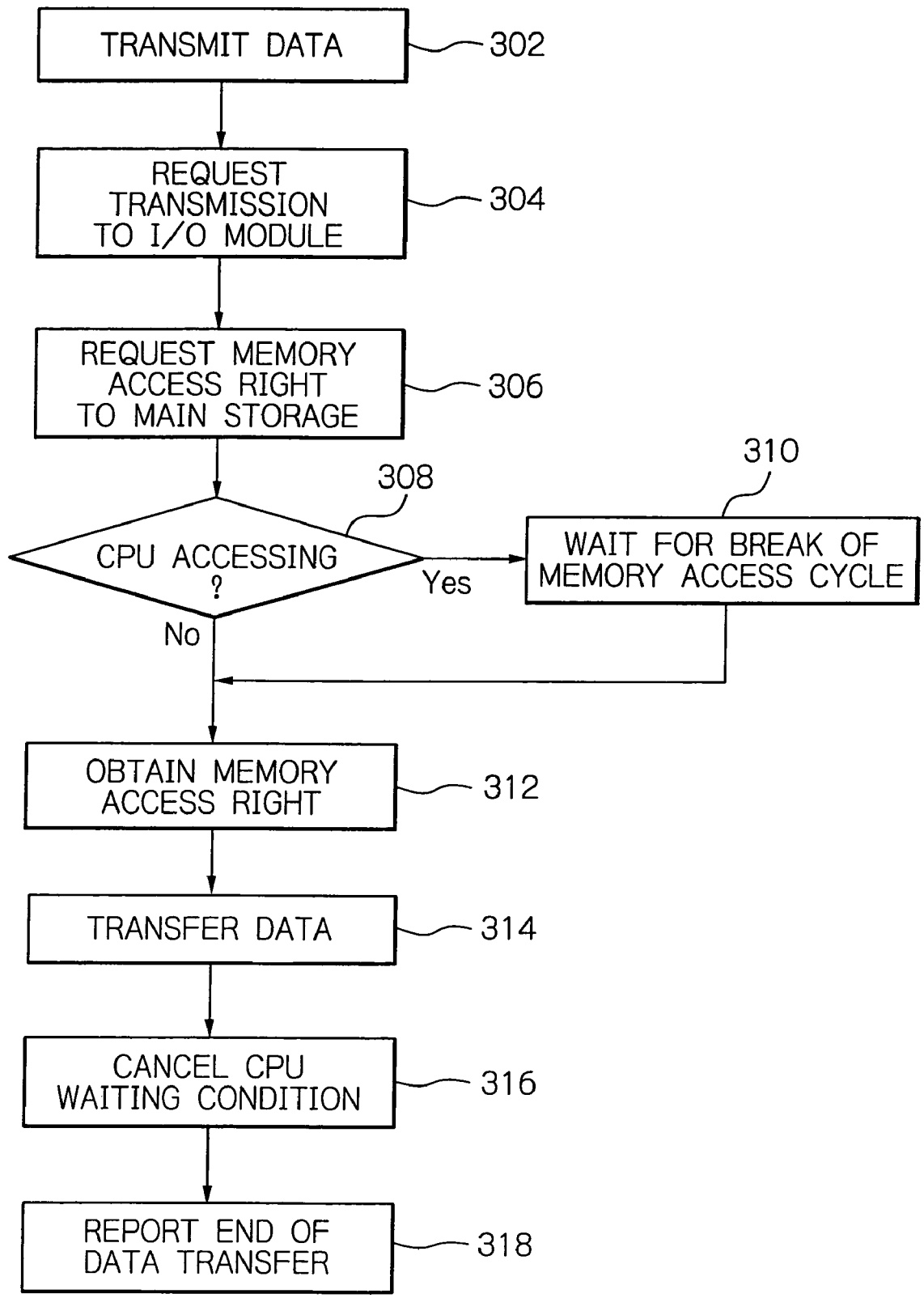
FIG. 3 is a flowchart useful for understanding a specific data transmission procedure also unique to the illustrative embodiment.

Referring to FIG. 3, a specific operation of the computer system 10 will be described for sending out data to the external unit 20. As shown, in the illustrative embodiment, transmission data begin to be fed to the external unit 20 under the control of the CPU 12 (step 302). The transmission data are written into the memory macro 22 of the main storage 14.

Subsequently, the CPU 12 generates a transmission request signal and feeds it to the I/O module 18 (step 304). In response, the I/O module 18 delivers a memory access right request signal to the memory macro 22 to the main storage 14 (step 306). The main storage 14 causes the access arbitrator 24 to determine whether or not the CPU 12 is accessing the main macro 22 as in the step 206 in response to the memory access right request signal (step 308).

If the answer of the step 308 is Yes when the break of the memory access cycle is detected in which the memory access right request signal is output from the I/O module 18, the access arbitrator 24 feeds the CPU 12 with a wait-for-access command signal (step 310) as in step 210 and the I/O module 18 with a memory access right allowance signal (step 312) as in the step 210. On the other hand, if the answer of the step 308 is No, the step 308 is then directly followed by a step 312.

Subsequently, the I/O module 18 executes the memory access right to the memory macro 22 to thereby read out the transmission data from the memory macro 22 and transfer them to the external unit 20 (step 314). At this time, the I/O module 18 feeds the address signal 110 representative of addresses to be read to the multiplexer 26. The multiplexer 26 then feeds the address signal 110 to the memory macro 22 in the form of address signal 112 in response to the control signal 104 output from the access arbitrator 24, the control signal 104 showing that the I/O module 18 has the memory access right. The data stored at the address locations designated by the address signal 112 are delivered from the memory macro 22 to the I/O module 18 as transmission data 122.

After the transfer of all transmission data from the memory macro 22 to the I/O module 18, the memory access right release signal is fed to the access arbitrator 24 as in the step 214 to thereby cancel the waiting condition of the CPU 12 (step 316). Further, the I/O module 18 sends a report indicative of the end of transmission data transfer. In this manner, when all transmission data are transferred to the I/O module 18, the memory access right to the memory macro 22 is switched from the I/O module 18 to the CPU 12.

Figure 4:
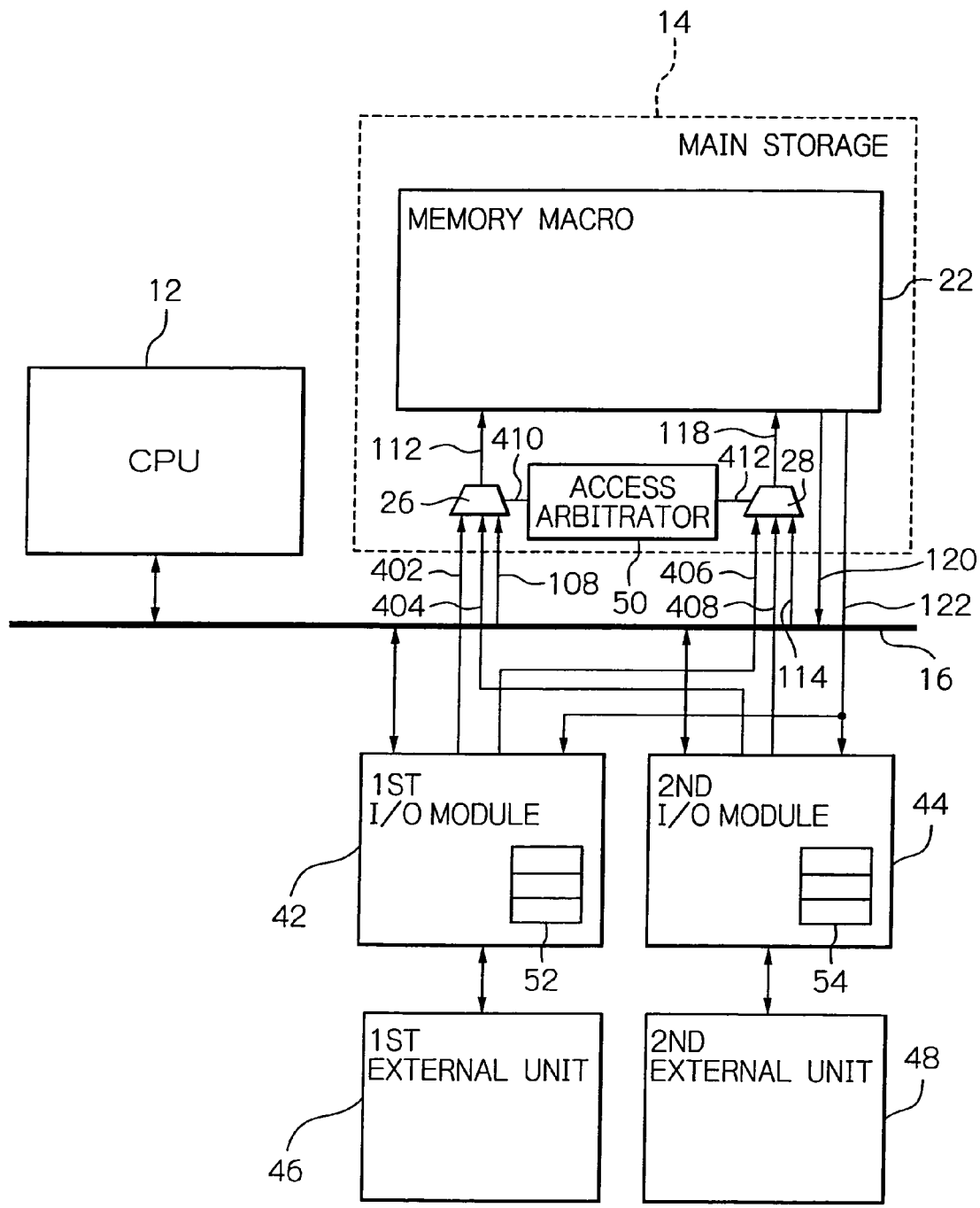
FIG. 4 is a block diagram schematically showing an alternative embodiment of the present invention.

FIG. 4 shows an alternative embodiment of the present invention. As shown, the computer system 10 includes a plurality of, e.g. two, I/O modules directly connected to the main storage 14 so as to transfer and receive data to and from a corresponding plurality of external units. For example, an access arbitrator 40 arbitrates the memory access right to the memory micro 22 between a first and a second I/O module 42 and 44, which are respectively connected to a first and a second external unit 46 and 48.

While a number of external units can be connected to the computer system 10 of the illustrative embodiment, FIG. 4 shows only a smaller number of external units and I/O modules associated therewith in order to avoid complexity.

In the illustrative embodiment, the access arbitrator 50 arbitrates between the CPU 12 and the first and second I/O modules 42 and 44 as to the memory access right to the memory macro 22 and then controls the first and second multiplexers 42 and 44 on the basis of the result of the arbitration. While the access arbitrator 50 of the illustrative embodiment is shown as arbitrating a smaller number of I/O modules as to the memory access right, it may, of course, be adapted to arbitrate a more number of I/O modules which may be connected to the computer system 10.

For example, the access arbitrator 50 of the illustrative embodiment gives the access arbitration every memory access cycle and may be configured to usually give the memory access right to the CPU 12. The access arbitrator 50 may, however, be adapted to alternately give the memory access right to the first and second modules 42 and 44 in response to an access request from the I/O module 42 or 44. In the illustrative embodiment, primary and secondary priorities may be given to the first and second I/O modules 42 and 44, respectively. Further, the access arbitrator 50 is capable of accepting a memory access right request any time and adding it to arbitration or accepting a memory access right release signal and excluding it from arbitration.

In the illustrative embodiment, the multiplexer 26 may be adapted for selecting an access from the bus 16 and first I/O module 42 in response to a control signal 410 output from the access arbitrator 50, selecting an address signal 108, 402 or 404 and then outputting the address signal selected in the form of address signal 112. Likewise, the multiplexer 28 may be adapted to select an access from the bus 16 and second I/O module 44, select data output 114, 406 or 408 and then output the data output selected as a data output 118. The address signal 112 and data output 118 are fed to the memory macro 22.

In the illustrative embodiment, the first and second I/O modules 42 and 44 play the role of interfaces connecting the computer system 10 with the first and second external units 46 and 48, respectively, and control the transfer of received data or transmission data between the main storage 14 and the external units 46 and 48, respectively. The I/O modules 42 and 44 may respectively include buffer memories 52 and 54 for storing the data.

The first and second external units 46 and 48 each are an input/output device of the kind compatible with an electronic apparatus to which the computer system 10 is applied. For example, the external units 46 and 48 each may be an input unit to which the user or external equipment inputs information, an output unit for outputting information stored in the computer system 10, or a flexible disk, a hard disk or any other kinds of storage medium usable for both of data input and output.

A specific operation of the alternative embodiment will be described with reference to FIG. 5 on the assumption that the computer system 10 receives data from both of the first and second external units 46 and 48. As shown, the first I/O module 42, received data from the first external unit 46, temporarily writes in them to the buffer memory 52, generates a first memory access right request signal and delivers this signal to the main storage 14 (step 502). Subsequently, the second I/O module 44, having received data from the second external unit 48, temporarily writes in them to a buffer memory 54 like the first I/O module 42, generates a second memory access right request signal and delivers this signal to the main storage 14 (step 504).

In the main storage 14, the first and second memory access right request signals are fed to the access arbitrator 50. The access arbitrator 50 executes arbitration such that a memory access right to the memory macro 22 is alternately given to the CPU 12, first I/O module 42 and second I/O module 44 every memory access cycle. The access arbitrator 50 determines, like in step 206, whether or not the CPU 12 is accessing (step 506).

When the CPU 12 is accessing the memory macro 22 (Yes, step 506) at the break of the memory access cycle in which the memory access right request signals are received, the CPU 12 receives await-for-access signal from the main storage 14 (step 508) as in the step 208, FIG. 2, and then the first I/O module 42 receives a memory access right allowance signal in response to the first memory access right request signal (step 510). On the other hand, if the CPU 12 is not accessing the memory macro 22 (No, step 506), then the step 506 is directly followed by a step 510.

In the step 510, the first I/O module 42 executes the memory access right and transfers the received data to the main storage 14. At this instant, the first I/O module 42 delivers an address signal 402 representative of a write address to the multiplexer 26, so that data associated with the write address is fed from a data output 406 to the multiplexer 28. The multiplexers 26 and 28 respectively feed the address signal 402 and data output 406 to the memory macro 22 in the form of address signal 112 and data output 118 in response to control signals 410 and 412. Consequently, the data output 118 is written into the address location of the memory macro 22 designated by the address signal 112.

On the elapse of the memory access cycle allotted to the first I/O module 42, the access arbitrator 50 feeds a memory access right release signal to the first I/O module 42 and then feeds a memory access right allowance signal to the second I/O module 44 (step 512). In the step 512, the second I/O module 44 executes the memory access right to transfer the received data to the main storage 14, i.e. delivers an address signal 404 and a data output 408 to the multiplexers 26 and 28, respectively, as in the step 510. The address signal 404 and data output 408 are then fed to the memory macro 22 in the form of address signal 112 and data output 118, respectively, in response to control signals 410 and 412.

Next, on the elapse of the memory access cycle allotted to the second I/O module 44, the access arbitrator 50 feeds a memory access right release signal to the second I/O module 44, cancels the access waiting condition of the CPU 12 and feeds a wait-for-access cancel signal to the CPU (step 514).

Thereafter, when the memory access cycle allotted to the CPU 12 expires, the procedure returns to the step 510, i.e. the access arbitrator 50 again gives the memory access right to the first I/O module 44. As stated above, the access arbitrator 50 repeatedly switches the memory access right to the CPU 12 and first and second I/O modules 42 and 44. Further, when the transfer of received data from the first I/O module 42 or the second module 44 ends, the I/O module ended the transfer is excluded from the arbitration.

For example, the first and second I/O modules 42 and 44 each are capable of determining whether or not the transfer of received data has ended (step 516). If the answer of the step 516 is Yes, the I/O module 42 or 44, when having ended the transfer of received data, delivers a memory access right release signal to the access arbitrator 50 and delivers an end-of-transfer report to the CPU 12 (step 518). If the answer of the step 516 is No, the procedure returns to the step 510.

Figure 5:
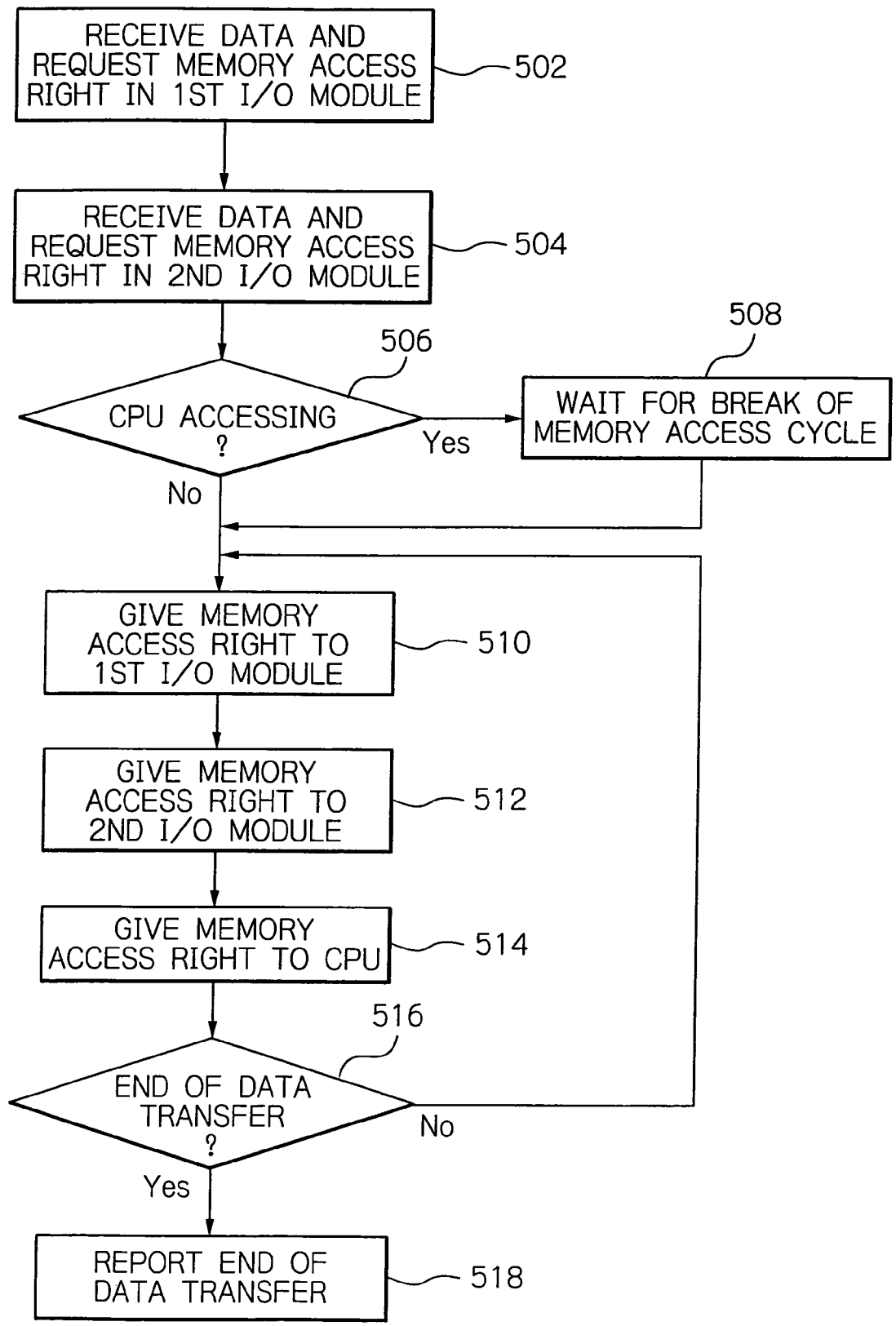
FIG. 5 is a flowchart useful for understanding a specific data receipt procedure available with the alternative embodiment shown in FIG. 4.

In the illustrative embodiment, when the control loop, consisting of the steps 510, 512, 514 and 516 shown in FIG. 5 is in execution, the other I/O module is also allowed to request an access to the access arbitrator 50. Further, the decision in the step 516 may be made by the individual I/O module, so that the I/O module having ended the transfer of received data can individually end the procedure of FIG. 5 via the step 518.

Figure 6:
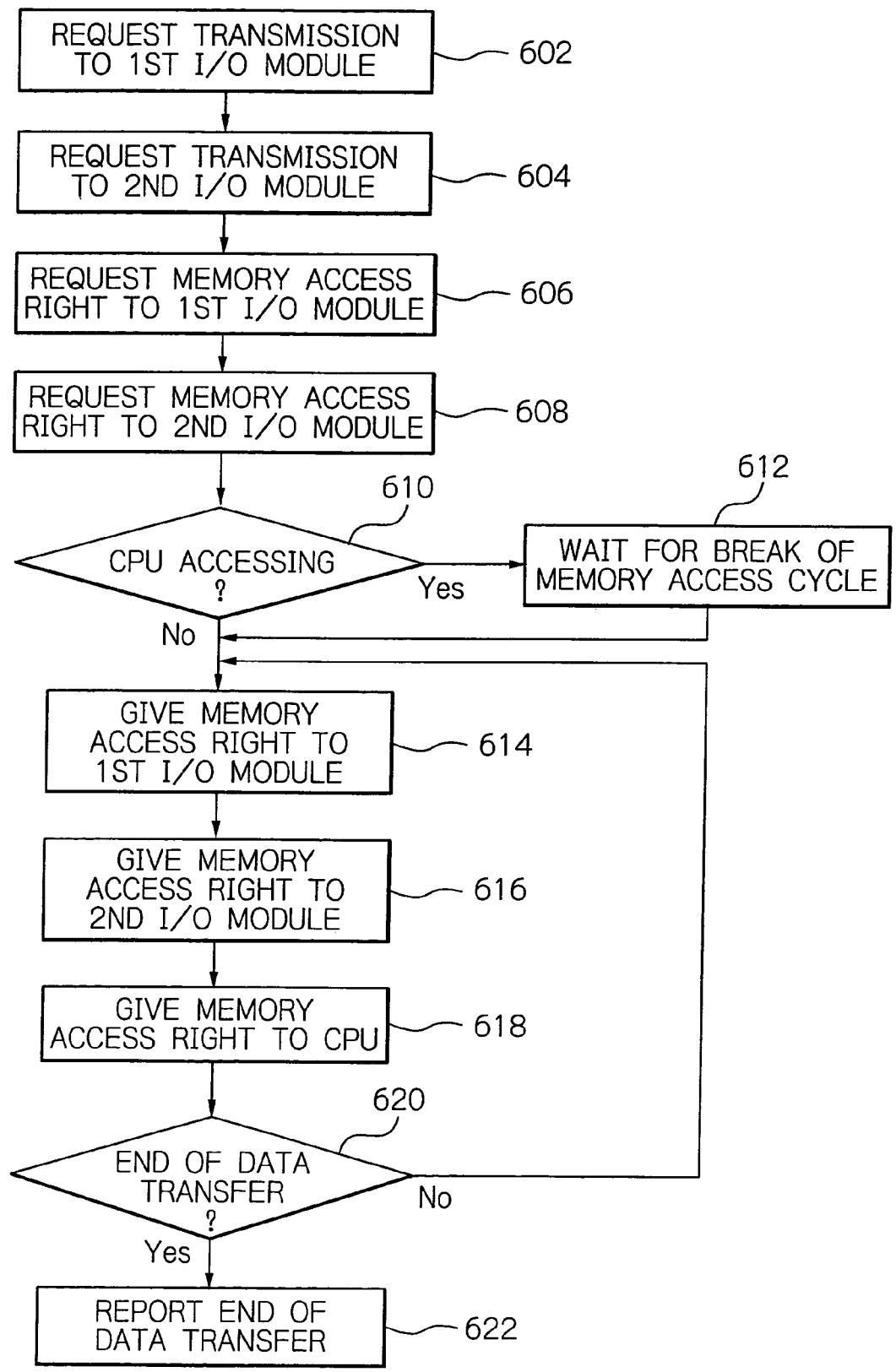
FIG. 6 is a flowchart useful for understanding a specific data transmission procedure also available with the alternative embodiment.
Figure 7:
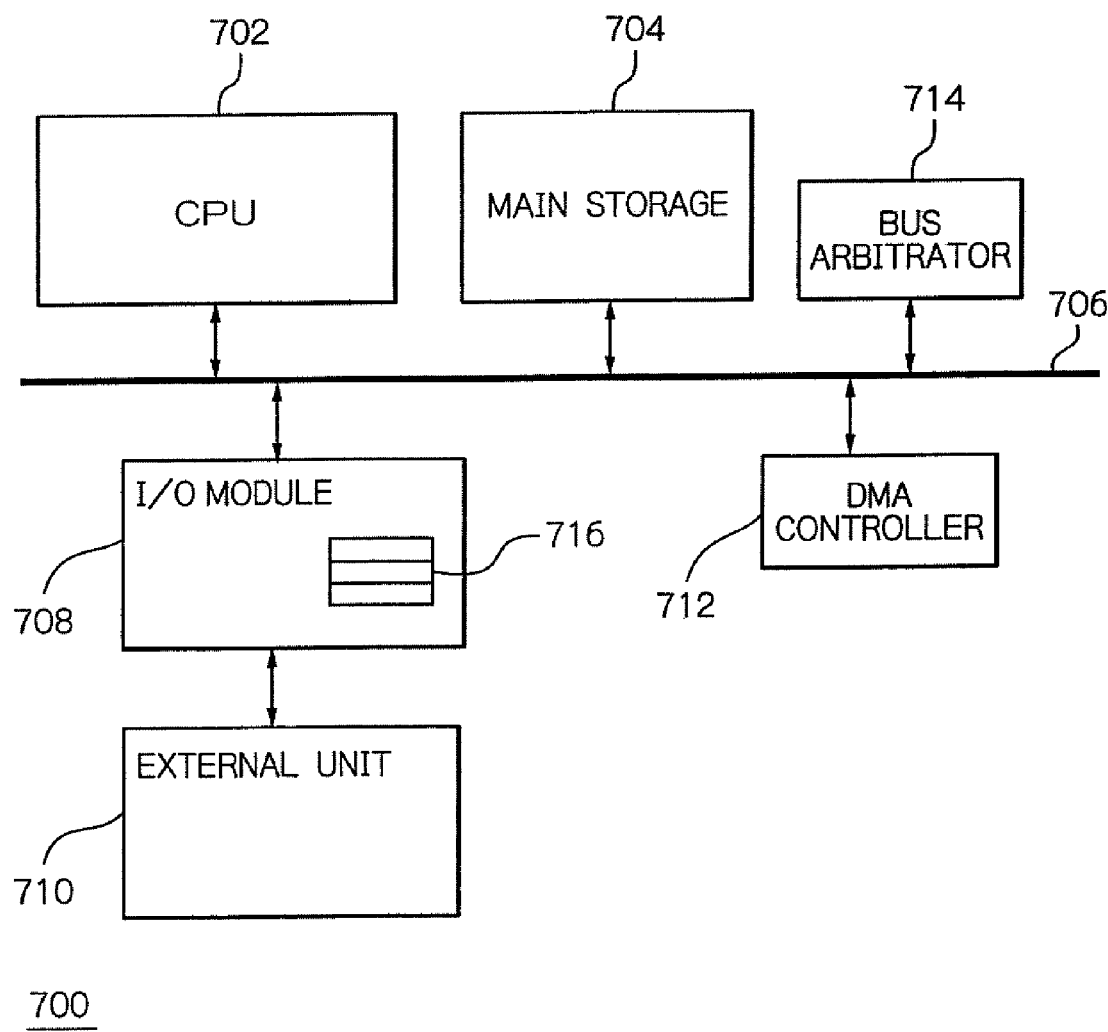
FIG. 7 is a schematic block diagram showing a conventional computer system.
Figure 8:
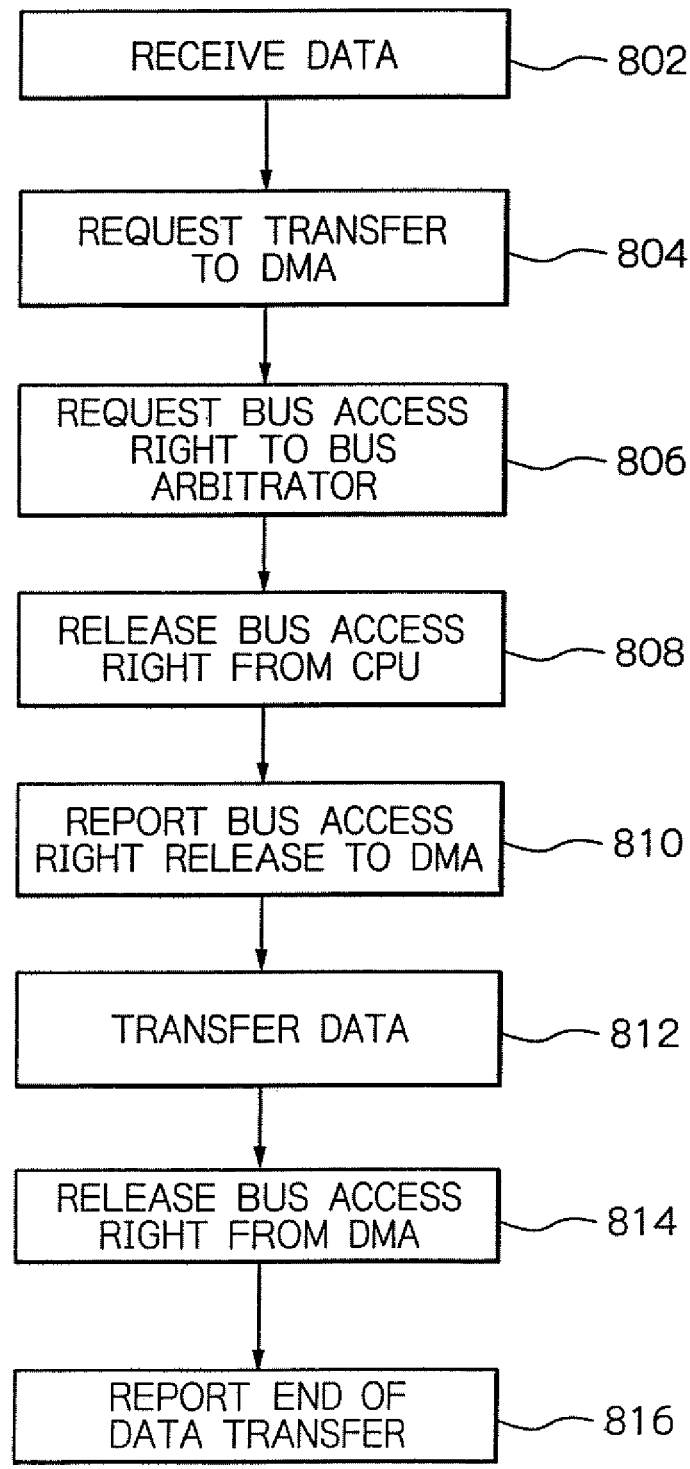
FIG. 8 is a flowchart useful for understanding a data receipt operation of the computer system shown in FIG. 7.

Reference will now be made to FIG. 6 for describing a specific procedure of the illustrative embodiment to be executed when data are sent out to the first and second external units 46 and 48.

In the illustrative embodiment, data begin to be sent out to the first external unit 46 under the control of the CPU 12 and are written into the memory macro 22 of the main storage 14. The CPU 12 generates a transmission request signal and feeds it to the first I/O module 42 assigned to the first external unit 46 (step 602). Likewise, data begin to be sent out to the second external unit 48 and are written into the memory macro 22 under the control of the CPU 12. The CPU 12 generates a transmission request signal and feeds the latter to the second I/O module 44 assigned to the second external unit 48 (step 604).

In response to the transmission request signal, the first I/O module 42 generates a first memory access right request signal and sends it to the main storage 14 (step 606). Likewise, in response to the transmission request signal, the second I/O module 44 generates a second memory access right request signal and sends it to the main storage 14 (step 608).

The main storage 14 delivers the first and second memory access right request signals to the access arbitrator 50. In response, the access arbitrator 50 arbitrates between the CPU 12, first I/O module 42 and second I/O module 44 as to the memory access right to the memory macro 22 in response to the memory access right request signals as in the step 506. The access arbitrator 50 determines, as in the step 206, whether or not the CPU 12 is accessing the memory macro 22 (step 610).

If the answer of the step 610 is Yes, meaning that the CPU 12 is accessing the memory macro 22 when the break of the memory access cycle is detected in which the memory access right request signal is received (Yes, step 610), the access arbitrator 50 feeds a wait-for-access command signal to the CPU 12 as in the step 208 (step 612). Subsequently, the access arbitrator 50 feeds a memory access right allowance signal to the first I/O module 42 in response to the first memory access right request signal (step 614). On the other hand, if the answer of the step 610 is No, a step 614 is executed just after the step 610.

In the step 614, the first I/O module 42 executes the memory access right, i.e. reads out transmission data from the memory macro 22 and sends them out to the first external unit 46. More specifically, the first I/O module 42 feeds the multiplexer 26 with an address signal representative of a read address. The address signal 402 is then delivered to the memory macro 22 in the form of address signal 112 in response to the control signal 410. In response, data are read out from an address location designated by the address signal 112 of the memory macro 22 and then transferred to the first external unit 46 via the first I/O module 42 as transmission data 122.

Upon the elapse of the memory access cycle allotted to first I/O module 42, the access arbitrator 50 feeds a memory access right release signal to the first I/O module 42 as in the step 512 while feeding a memory access right allowance signal to the second I/O module 44 (step 616).

In the step 616, the second I/O module 44 reads out transmission data from the memory macro 22 and transfers them to the external unit 48. More specifically, an address signal 402 is fed to the multiplexer 26 as in the step 614 and then fed to the memory macro 22 in the form of address signal 112 as in the step 614. As a result, transmission data 122 designated by the address signal 112 are transferred to the second external unit 48 via the second I/O module 46.

On the elapse of the memory access cycle allotted to second I/O module 44, the access arbitrator 50 feeds a memory access right release signal to the second I/O module 44 as in the step 514 while feeding a wait-for-access cancel signal to the CPU 12 (step 618).

The access arbitrator 50 is capable of switching the memory access right between the CPU 12, the first I/O module 42 and the second module 44 even when the transfer of transmission data is under way. When data transfer via the first or the second I/O module 42 or 44 ends, the subject I/O module is excluded from the arbitration. For example, the first I/O module 42 or the second I/O module 44 is capable of determining whether or not the transfer of transmission data has ended (step 620) as in the step 516. If the answer of the step 620 is Yes, a memory access right release signal is fed to the access arbitrator 50 while an end-of-transfer report is output to the CPU 12 (step 622). Whenever the answer of the step 620 is No, the control loop, consisting of the steps 614, 616, 618 and 620, will be repeated.

It should be noted that even when the loop, consisting of the steps 614, 616, 618 and 620, is being executed, another I/O module can send a memory access right request to the access arbitrator 50. Also, the step 620 may be executed with each I/O module, so that the individual I/O module having transferred transmission data can advance to the step 622, ending the flow shown in FIG. 6.

In the illustrative embodiment, the steps 510, 512, 514 and 516, FIG. 5, for received data transfer constitute a single loop while the steps 614, 616, 618 and 620, FIG. 6, for transmission data transfer constitute a single loop. However, since it is sufficient for the access arbitrator 24 to function as arbitrating a plurality of I/O modules and a CPU as to a memory access right in response to the memory access right request signals output from the I/O modules, the access arbitrator 24 may alternatively be adapted to arbitrate the memory access right in such a manner as to arbitrate access requests based on the transfers of received and transmission data to deal with the transfers of received and transmission data in a single control loop.

It is to be noted that the computer system of the present invention is applicable not only to LSIs but also to data transferring devices employing I/O modules in general-purpose computer systems.

The entire disclosure of Japanese patent application No. 2004-206993 filed on Jul. 14, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What I claim is:

1. A computer system comprising:
   an input/output circuit connectable to a utility device and configured to transfer and receive data to or from the utility device;
   a main storage configured to store the data received and to transmit data to be transferred;
   a control circuit connected to said main storage via a bus and configured to read out the received data stored in said main storage and to write the transmission data to said main storage; and
   at least one direct connecting line configured to directly link said main storage exclusively with said input/output circuit;
   said input/output circuit being directly connected to said main storage by the direct connecting line and being configured to directly write the received data transferred from the utility device to said main storage and to directly read out the transmission data from said main storage to transfer the transmission data to the utility device to thereby execute DMA (Direct Memory Access) transfer without using bus,
   said main storage comprising a memory for storing the received data or the transmission data, and an arbitrator for arbitrating a memory access right each having access to said memory without using the bus,
   said arbitrator switching the memory access right in response to a request signal that requests an allowance of the memory access right,
   said input/output circuit feeding the request signal to said arbitrator in order to execute DMA transfer, and executing, when the memory access right is allowed, the DMA transfer to said memory.

2. The computer system in accordance with claim 1, wherein said arbitrator switches the memory access right every memory access cycle, and accepts, at a break of a first memory access cycle in which the request signal is received or a break at which a predetermined number of memory access cycles end following the first memory access cycle, the memory access right in response to the request signal when another memory access cycle begins following the break.

3. The computer system in accordance with claim 2, wherein the memory access cycle comprises a minimum unit cycle accessible to said memory or a predetermined number of the minimum unit cycles.

4. The computer system in accordance with claim 2, wherein said arbitrator gives the memory access right to either one of said control circuit and said input/output circuit.

5. The computer system in accordance with claim 4, wherein said arbitrator usually gives the memory access right to said control circuit, but gives, upon receiving the request signal from said input/output circuit, the memory access right alternately to said control circuit and said input/output circuit every memory access cycle.

6. The computer system in accordance with claim 5, wherein said arbitrator comprises a decision circuit for determining, in response to the request signal, whether or not said control circuit is accessing said memory during the memory access cycle in which the request signal is received,
   said arbitrator feeding, if said control circuit is accessing said memory when the request signal is received from said input/output circuit, said control circuit with a waitfor-access signal at a break of the memory access cycle and said input/output circuit with a memory access right allowance signal, said input/output circuit feeding, at an end of the DMA transfer, a memory access right release signal to said arbitrator, and delivering an end-of-transfer report representative of the end of data transfer to said control circuit, said arbitrator canceling, in response to the memory access right release signal, an access waiting condition of said control circuit, and feeding a wait-for-access cancel signal to said control circuit.

7. The computer system in accordance with claim 6, wherein said input/output circuit feeds the request signal to said arbitrator when having received the data from the utility device, writes in the data to said memory, performs the DMA transfer when given the memory access right, and delivers the end-of transfer report to said control circuit when the DMA transfer ends.

8. The computer system in accordance with claim 7, wherein said control circuit reads out the received data from said memory in response to the end-of -transfer report.

9. The computer system in accordance with claim 6, wherein said control circuit controls transfer of the transmission data to be transmitted, stores the transmission data in said memory, and feeds a transmission request signal to said input/output circuit when having the memory access right, said input/output circuit feeding, in response to the transmission request signal, the memory access right request signal to said arbitrator, and reading out, when given the memory access right, the transmission data from said memory to perform the DMA transfer.

10. The computer system in accordance with claim 1, wherein said input/output circuit comprises a register for temporarily storing the received data or the transmission data.

11. The computer system in accordance with claim 4, further comprising an additional input/output circuit connectable to an additional utility device, wherein said arbitrator gives the memory access right to either one of said control circuit and said input/output circuits.

12. The computer system in accordance with claim 11, wherein said arbitrator arbitrates, upon receiving a first memory access right request signal for transfer of the received data and a second memory access right request signal for transfer of the transmission data, an allowance of the memory access right between at least said input/output circuits having output the first and second memory access right request signals.

13. A method of transferring data for a computer system comprising an input/output circuit connected to a utility device for transferring or receiving data to or from the utility device, a storage for storing the data received or transmission data to be transferred, and a control circuit connected to the storage via a bus for reading out the data stored in the storage or writing in the transmission data to the storage, at least one direct connecting line configured to directly link the storage exclusively with the input/output circuit and to transmit read and write transmission data between the storage and the input/output circuit, said method comprising:

a storage control step of controlling the received data or the transmission data to be input to or output from the storage;

an input/output controlling step of controlling transfer of the received data or the transmission data between the input/output circuit and the storage; and a controlling step of causing the controlling circuit to read out the received data stored in the storage or write in the transmission data to the storage;

in said input/output controlling step, DMA transfer being executed by causing the input/output circuit to directly write in the received data transferred from the utility device to the storage or to directly read out the transmission data from the storage to transfer the transmission data to the utility device by using the direct connecting line without using the bus, said storage control step comprising an arbitrating substep of arbitrating allowance of a memory access right having access to the storage without using the bus, said arbitrating substep comprising switching the memory access right in response to a memory access right request signal that requests the allowance of the memory access right, in said input/output controlling step, the memory access right request signal being fed to said arbitrating substep in order to execute the DMA transfer, and the DMA transfer being executed to the storage when the memory access right is allowed.

14. The method in accordance with claim 13, wherein, in said arbitrating step, the memory access right is switchable in every memory access cycle, and the memory access right is accepted, at a break of a first memory access cycle in which the memory access right request signal is received or a break at which a predetermined number of memory access cycles end following the first memory access cycle, in response to the request signal when another memory access cycle begins following the break.

15. The method in accordance with claim 14, wherein the memory access cycle comprises a minimum unit cycle accessible to the storage or a predetermined number of the minimum unit cycles.

16. The method in accordance with claim 14, wherein said arbitrating step comprises giving the memory access right to either one of said controlling step and said input/output controlling step.

17. The method in accordance with claim 16, wherein said arbitrating step comprises usually giving the memory access right to said controlling step, but giving, upon receiving the memory access right request signal from said input/output controlling step, the memory access right alternately to said controlling step and said input/output controlling step every memory access cycle.

18. The method in accordance with claim 17, wherein said arbitrating step comprises the substep of deciding, in response to the memory access right request signal, whether or not said controlling step is accessing the storage during the memory access cycle in which the request signal is received, said arbitrating step feeding, if said substep of deciding that said controlling step is accessing the storage when the request signal is received from said input/output controlling step, a wait-for-access signal to said controlling step at a break of the memory access cycle and a memory access right allowance signal to said input/output controlling step, said input/output controlling step feeding, at an end of the DMA transfer, a memory access right release signal to said arbitrating step, and delivering an end-of-transfer report representative of the end of data transfer to said controlling step, said arbitrating step canceling, in response to the memory access right release signal, an access waiting condition of said controlling step, and feeding a wait-for-access cancel signal to said controlling step.

19. The method in accordance with claim 18, wherein said input/output controlling step comprises feeding the memory access right request signal to said arbitrating step when having received data from the utility device, writing in the data to the storage, performing the DMA transfer when given the memory access right, and delivering the end-of-transfer report to said controlling step when the DMA transfer ends.

20. The method in accordance with claim 19, wherein said controlling step comprises reading out the received data from the storage in response to the end-of- transfer report.

21. The method in accordance with claim 18, wherein said controlling step comprises controlling transfer of the transmission data to be transmitted, storing the transmission data in the storage, and feeding a transmission request signal to said input/output controlling step when having the memory access right, said input/output controlling circuit feeding, in response to the transmission request signal, the memory access right request signal to said arbitrating step, and reading out, when given the memory access right, the transmission data from the storage to perform the DMA transfer.

22. The method in accordance with claim 13, wherein said input/output controlling step comprises temporarily storing the received data or the transmission data in a register included in the input/output circuit.

23. The method in accordance with claim 16, wherein the computer system further comprises an additional input/output circuit connected to an additional utility device, said method further comprising an additional input/output controlling step of controlling the transfer of the received data or the transmission data between the additional input/output circuit and the storage, said arbitrating step giving the memory access right to either one of said controlling step and said input/output controlling steps.

24. The method in accordance with claim 23, wherein said arbitrating step arbitrates, upon receiving a first memory access right request signal for transfer of the received data and a second memory access right request signal for transfer of the transmission data, an allowance of the memory access right between at least said input/output controlling steps having output the first and second memory access right request signals.

\* \* \* \* \*